United States Patent Office 2,862,976
Patented Dec. 2, 1958

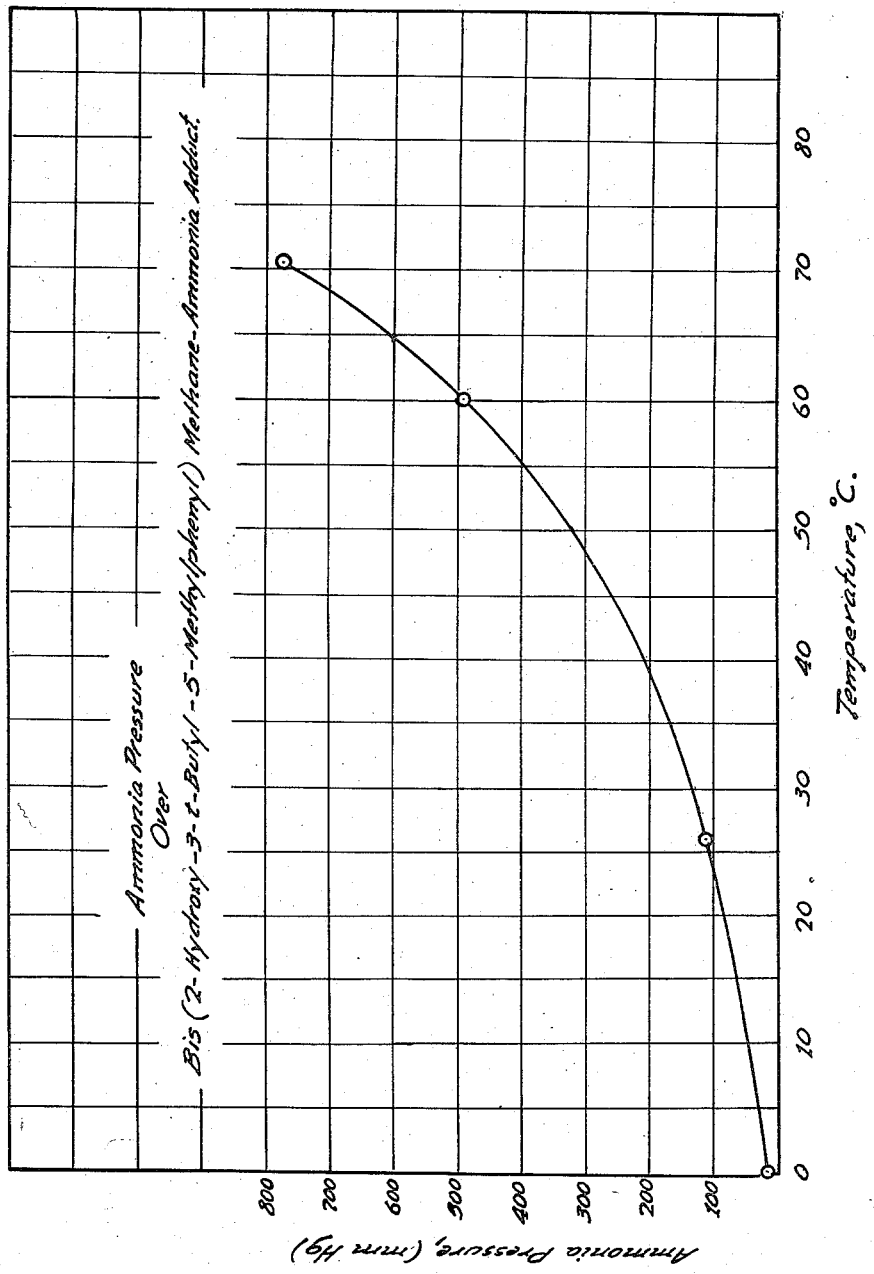

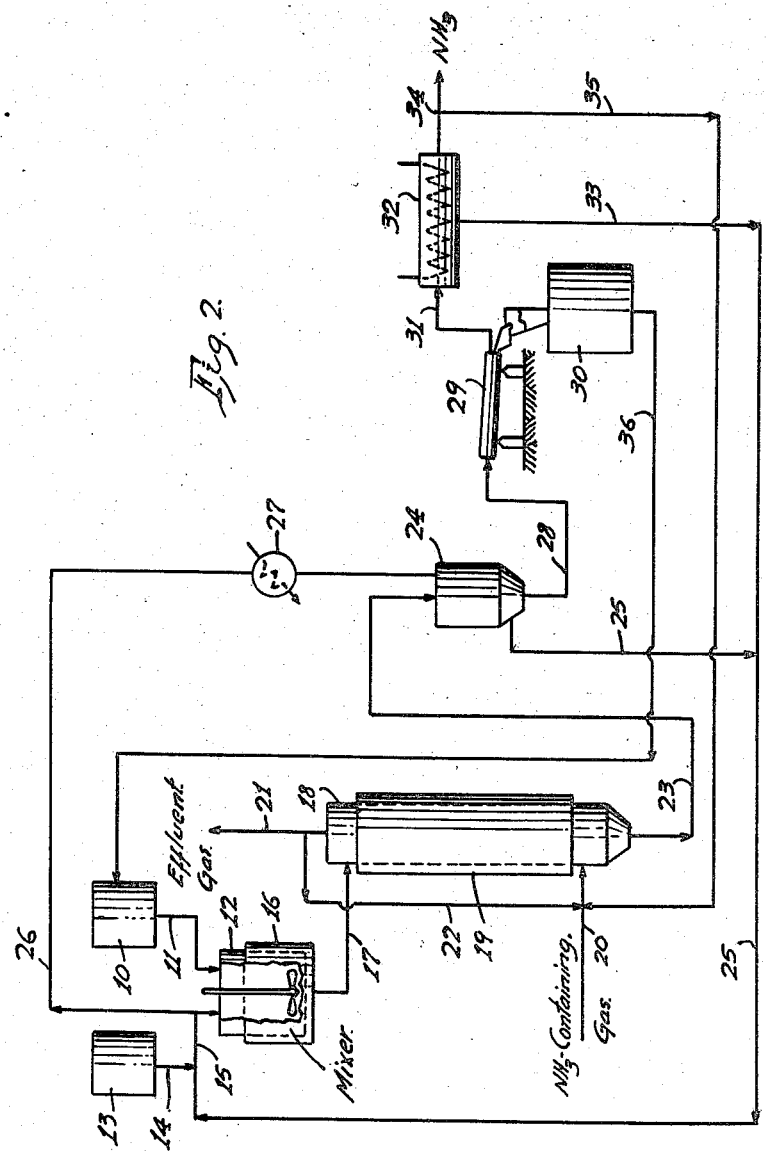

2,862,976

PURIFICATION PROCESS

Arthur C. Dubbs, Springdale, and Donald R. Stevens, Wilkinsburg, Pa., assignors to Gulf Research & Development Company, Pittsburgh, Pa., a corporation of Delaware Application October 14, 1953, Serial No. 386,032

12 Claims. (Cl. 260—619)

This invention relates to the production of a bis(hydroxyphenyl)alkane and ammonia, and more particularly to a process of recovering a substantially pure bis(hydroxyphenyl)alkane from closely related compounds such as the phenolic starting materials used in the preparation of the bis(hydroxyphenyl)alkane and the intermediate or side reaction products obtained from such preparation, and to the separation of substantially pure ammonia from ammonia containing contaminants.

The bis(hydroxyphenyl)alkanes are particularly valuable for use as anti-oxidants in various organic compositions, both solid and liquid, normally tending to undergo oxidational changes. Some of the organic compositions in which a bis(hydroxyphenyl)alkane can be incorporated as an antioxidant are motor fuels, aviation fuels, jet fuels, marine fuels, diesel fuels, lubricating oils, turbine oils, transformer oils, furnace oils, waxes, rubber, resins, plastics, animal and vegetable fats and oils, including lard, lard oil, linseed oil, and the like. In addition to their anti-oxidant properties, the bis(hydroxyphenyl)alkanes are also useful alone or in combination with filling materials as the basis of pressed articles, as binding agents, or for preparing varnishes and other coating or impregnating agents. They are further useful as blending agents in the manufacture of various polishing agents such as shoe polish, floor polish, furniture polish, and the like. They may also be used as, or in conjunction with plasticizers, tackifiers, insecticides, and fungicides. When the bis(hydroxyphenyl)alkanes are used in compositions which may come in contact with food products, it is essential that the additive be extremely pure, odorless and nontoxic. Also, when the compounds are used in light-colored products, particularly light rubber such as that used in white side-wall tires, it is essential that the compound be sufficiently pure that it will not discolor the rubber. Of course, this is also important when the compounds are incorporated in other light products such as paraffin wax, lard, and the like.

We have found that by treating a composition comprising a gem-bis(hydroxyphenyl)alkane at a relatively low temperature with an ammonia-containing medium, such as impure ammonia gas or liquids containing ammonia, an adduct is formed between the bis(hydroxyphenyl)alkane and the ammonia. The term "gem" as used in organic chemistry is an abbreviation of the word "geminate" and signifies two identical groups attached to the same carbon atom, for example, where, as here, two identical hydroxyphenyl groups are attached to the same carbon atom on the connecting alkane. The adduct after separation from the reaction mass can be readily dissociated into substantially pure ammonia and a substantially pure bis(hydroxyphenyl)alkane. The process of our invention is therefore useful not only in purifying a bis(hydroxyphenyl)alkane but also in purifying ammonia. When the primary object is to purify ammonia, the bis(hydroxyphenyl)alkane can comprise a crude mixture of such bis(hydroxyphenyl)alkanes.

Some of the impurities which may be removed from the bis(hydroxyphenyl)alkanes in accordance with the process of the invention are the phenolic starting materials, intermediate and side reaction products, polymers and resins. The process is also applicable to the separation of homologous bis(hydroxyphenyl)alkanes inasmuch as the various bis(hydroxyphenyl)alkane-ammonia adducts have different solubility characteristics. Impurities from which the ammonia can be separated include air, hydrogen, methane, ethane and other hydrocarbons both gaseous and liquid as well as carbon dioxide, carbon monoxide, nitrogen and certain aliphatic, heterocyclic and aromatic amines including n-butylamine, quinoline, aniline, toluidine, anisidine, naphthylamine, and the like.

The bis(hydroxyphenyl)alkanes which can be purified in accordance with the process of the invention are those obtained by the condensation of a phenol and an organic carbonyl compound. As examples of the phenols which may be condensed with an organic carbonyl compound are phenol, cresols, xylenols, ethylphenols, and alkyl, hydroxyalkyl, haloalkyl, alkoxyalkyl, alkoxy, nitro and halo derivatives thereof. Specific examples of the phenols include phenol (itself); metacresol; paracresol; orthocresol; 2,4-dimethylphenol; 2-ethylphenol; 2,4-diethylphenol; 2-isopropylphenol; 2-isopropyl-4-methylphenol; 2,4-diisopropylphenol; 2-sec-butylphenol; 2-tert-butylphenol; 4-sec-butylphenol; 4-tert-butylphenol; 2,4-di-sec-butylphenol; 2,4-di-tert-butylphenol; 2-methyl-4-tert-butylphenol; 2-methyl-4-sec-butylphenol; 2-sec-butyl-4-methylphenol; 2-tert-butyl-4-methylphenol; 2-sec-butyl-4-ethylphenol; 2-tert-butyl-4-ethylphenol; 3-methyl-6-sec-butylphenol; 3-methyl-6-t-butylphenol; 3-methyl-4-sec-butylphenol; 3-methyl-4-tert-butylphenol; 4-isooctylphenol; 2-methyl-4-isooctylphenol; parachlorophenol; metanitrophenol; and the like.

As examples of the organic carbonyl compounds which can be used in the condensation of the phenols, are the ketones and the aldehydes. Specific examples of some of the ketones which may be used are as follows: acetone; methyl ethyl ketone; methyl isobutyl ketone; 1,3-diphenyl-2-propanone; propiophenone; 1-phenyl-2-propanone; 3,3-dimethyl-2-butanone; 3,3-diphenyl-2-butanone; 3-methyl-2-butanone; 1-phenyl-2-butanone; 4-phenyl-2-butanone; 2-pentanone; 3-methyl-2-pentanone; 4-methyl-2-pentanone; 2,2,4,4-tetramethyl-3-pentanone; 3-pentanone; 2,4-dimethyl-3-pentanone; 2-methyl-3-pentanone; 4,4-dimethyl-2-pentanone; 2-hexanone; 5-methyl-2-hexanone; 3-hexanone; 5-methyl-3-hexanone; 2-heptanone; 3-heptanone; 6-methyl-3-heptanone; 4-heptanone; 2,6-dimethyl-4-heptanone; 2-methyl-4-heptanone; 2-octanone; 3-octanone; 2-nonanone; 3-nonanone; 5-nonanone; 2,8-dimethyl-5-nonanone; 2-decanone; 3-decanone; 4-decanone; benzophenone; 4,4'-dimethylbenzophenone; acetophenone; 5-isopropyl-2-methylacetophenone; p-methylacetophenone; desoxybenzoin; butyrophenone; isobutyrophenone; and the like. The aldehydes which may be used are formaldehyde; acetaldehyde; propionaldehyde; butyraldehyde; isobutyraldehyde; isovaleraldehyde; caproaldehyde; benzaldehyde; salicylaldehyde; cinnamaldehyde; ortho-, meta-, and paratolualdehyde; phenylacetaldehyde; 2-ethylhexaldehyde, pivalaldehyde; and the like.

In the preparation of the condensation products, 2 mols of the phenol are reacted with one mol of the organic carbonyl compound in the presence of a condensation catalyst such as anhydrous hydrogen chloride and zinc chloride. The ratio of the phenol to the organic carbonyl compound is, therefore, advantageously maintained at about 2:1. This ratio is based upon the use of a monomer of the organic carbonyl compound. If a polymeric aldehyde is employed, the amount of the polymer used is based upon the equivalent number of mols of the monomer appearing in the polymer. For instance, if a trimer of the aldehyde is used, such as trioxane, the molecular ratio of the phenol to the trimer would be about 6:1. The reaction is advantageously carried out in the presence of a common solvent such as glacial acetic acid, hexane, benzene, and the like. In the course of the reaction water is formed, the reaction product separating out as a liquid or a solid. Upon separation of the reaction product from the solvent layer, such as glacial acetic acid when it is the solvent, the reaction product is washed with water and/or aqueous alkali solution. This washing removes any remaining acid condensation catalyst and also any remaining acetic acid solvent. The washed product thus obtained, however, may contain undesirable amounts of contaminants including unreacted phenolic starting materials, intermediate and side reaction products, polymers and resins. While some purification can be accomplished by recrystallization, a high degree of purity ordinarily requires in the order of four or five recrystallizations, with a considerable loss in yield taking place with each recrystallization. In accordance with the present invention, a high degree of purification with correspondingly high yields is obtained through the formation of an adduct.

In addition to anhydrous hydrogen chloride and zinc chloride, other condensation catalysts which can be used for condensing the phenol with the organic carbonyl compound include sulfuric acid, phosphoric acid, anhydrous aluminum chloride, boron trifluoride, boron fluoride complexes, ferric chloride, anhydrous zinc chloride, activated clays such as acid-treated fuller's earth, bentonite, floridin, silica-alumina, and the like. The amount of the condensing agent required may be about 0.1 percent based on the total weight of the reactants. However, larger amounts as high as about 20 percent by weight may also be employed. More than about 10 percent of the condensation catalyst is not ordinarily necessary. The condensation reaction is carried out at a temperature below about 100° C. and advantageously at a temperature within the range of about 0° to about 50° to 55° C. If the temperature is allowed to exceed 100° C. for an extended period of time, an excess of undesirable side reactions may take place.

Specific examples of some of the gem-bis(hydroxyphenyl)alkanes which are prepared by the condensation reaction and which may be purified by the process of this invention include bis(2-hydroxyphenyl)methane; bis-(4-hydroxyphenyl)methane; 1,1 - bis(2 - hydroxyphenyl)ethane; 1,1-bis(4-hydroxyphenyl)ethane; 1,1-bis(2-hydroxyphenyl)propane; 1,1-bis(4-hydroxyphenyl)propane; 1,1 - bis(2 - hydroxyphenyl)butane; 1,1 - bis(4 - hydroxyphenyl)butane; 2,2-bis(4-hydroxyphenyl)propane; 2,2-bis-(4-hydroxyphenyl)butane; 2,2-bis(2-hydroxyphenyl)propane; bis(2-hydroxy-3-methylphenyl)methane; 1,1-bis(2-hydroxy - 3 - methylphenyl)ethane; 1,1-bis(2-hydroxy-3-methylphenyl)propane; 1,1 - bis(2 - hydroxy - 3 - methylphenyl)butane; 1,1-bis(2-hydroxy-3-methylphenyl)isobutane; bis(2-hydroxy-4-methylphenyl)methane; 1,1-bis(2-hydroxy - 4 - methylphenyl)ethane; 1,1-bis(2-hydroxy-4-methylphenyl)propane; 1,1 - bis(2 - hydroxy - 4 - methylphenyl)butane; 1,1-bis(2-hydroxy-4-methylphenyl)isobutane; bis(2-hydroxy-5-methylphenyl)methane; 1,1-bis(2-hydroxy - 5 - methylphenyl)ethane; 1,1-bis(2-hydroxy-5-methylphenyl)propane; 1,1-bis(2-hydroxy-5-methylphenyl)butane; 1,1-bis(2-hydroxy-5-methylphenyl)isobutane; bis(2-hydroxy-3-ethylphenyl)methane; 1,1-bis(2-hydroxy-3 - ethylphenyl)ethane; 1,1-bis(2-hydroxy-3-ethylphenyl)propane; 1,1-bis(2-hydroxy-3-ethylphenyl)butane; 1,1-bis-(2-hydroxy-3-ethylphenyl)isobutane; bis(2-hydroxy-3-isopropylphenyl)methane; 1,1-bis(2-hydroxy - 3 - isopropylphenyl)ethane; 1,1-bis(2-hydroxy-3-isopropylphenyl)propane; 1,1-bis(2-hydroxy-3-isopropylphenyl)butane; 1,1-bis(2 - hydroxy - 3 - isopropylphenyl)isobutane; bis(2-hydroxy-3-sec-butylphenyl)methane; 1,1 - bis(2-hydroxy-3- sec-butylphenyl)ethane; 1,1-bis(2-hydroxy - 3 - sec-butylphenyl)propane; 1,1-bis(2-hydroxy - 3 - sec-butylphenyl)butane; 1,1-bis(2 - hydroxy-3-sec-butylphenyl)isobutane; bis(2-hydroxy-3-t-butylphenyl)methane; 1,1 - bis(2 - hydroxy-3-t-butylphenyl)ethane; 1,1-bis(2-hydroxy-3-t-butylphenyl)propane; 1,1-bis(2 - hydroxy-3-t-butylphenyl)butane; 1,1-bis(2-hydroxy-3-t-butylphenyl)isobutane; bis(2-hydroxy-5-sec-butylphenyl)methane; 1,1-bis(2-hydroxy-5-sec-butylphenyl)ethane; 1,1 - bis(2 - hydroxy-5-sec-butylphenyl)propane; 1,1 - bis(2 - hydroxy - 5 - sec - butylphenyl)butane; 1,1-bis(2-hydroxy-5-sec-butylphenyl)isobutane; 1,1 - bis(2-hydroxy-5-sec-butylphenyl)-1-phenylethane; 1,1-bis(2-hydroxy-5-sec-butylphenyl)-1-phenylpropane; bis(2-hydroxy-5-sec-butylphenyl)diphenylmethane; bis(2 - hydroxy-5-sec-butylphenyl)-4,4'-dimethyldiphenylmethane; bis(2 - hydroxy - 5 - sec-butylphenyl)-4-methylphenylmethane; 1,1-bis(2-hydroxy-5-sec-butylphenyl)-2-phenylethane; bis(2 - hydroxy-5-t-butylphenyl)methane; 1,1 - bis(2-hydroxy-5-t-butylphenyl)ethane; 1,1-bis(2-hydroxy-5-t-butylphenyl)propane; 1,1 - bis(2 - hydroxy-5-t-butylphenyl)butane; 1,1 - bis(2-hydroxy-5-t-butylphenyl)isobutane; 1,1 - bis(2-hydroxy-5-t-butylphenyl)-1-phenylethane; 1,1-bis(2-hydroxy-5-t-butylphenyl)-1-phenylpropane; bis(2 - hydroxy-5-t-butylphenyl)diphenylmethane; bis(2-hydroxy-5-t-butylphenyl) - 4,4' - dimethyldiphenylmethane; bis(2-hydroxy-5-t-butylphenyl)-4-methylphenylmethane; 1,1 - bis(2 - hydroxy-5-t-butylphenyl)-2-phenylethane; bis(2-hydroxy-5-isooctylphenyl)methane; 1,1-bis-(2-hydroxy-5-isooctylphenyl)ethane; 1,1-bis(2-hydroxy-5-isooctylphenyl)propane; 1,1-bis(2-hydroxy - 5 - isooctylphenyl)butane; 1,1-bis(2-hydroxy-5-isooctylphenyl)isobutane; 1,1-bis(2-hydroxy-5-isooctylphenyl)-1-phenylethane; 1,1-bis(2-hydroxy-5-isooctylphenyl)-1-phenylpropane; bis-(2-hydroxy-5-isooctylphenyl)diphenylmethane; bis(2-hydroxy - 5 - isooctylphenyl)-4,4'-dimethyldiphenylmethane; bis(2-hydroxy-5-isooctylphenyl)-4-methylphenylmethane; 1,1-bis(2-hydroxy-5-isooctylphenyl)-2-phenylethane; 2,2-bis(2-hydroxy-3-methyl-5-t-butylphenyl)propane; 2,2-bis-(2-hydroxy-3-methyl-5-t-butylphenyl)butane; 1,1 - bis(2-hydroxy-3-methyl-5-t-butylphenyl)-1-phenylethane; 1,1-bis(2-hydroxy-3-methyl - 5 - t - butylphenyl)-1-phenylpropane; bis(2-hydroxy-3-methyl-5-t-butylphenyl)diphenylmethane; bis(2 - hydroxy-3-methyl-5-t-butylphenyl)-4,4'-dimethyldiphenylmethane; 2,2-bis(2-hydroxy-3-methyl-5-t-butylphenyl)-1,3-diphenylpropane; 2,2-bis(2-hydroxy-3-methyl-5-sec-butylphenyl)propane; 1,1 - bis(2-hydroxy-3-methyl-5-sec-butylphenyl)-1-phenylethane; 2,2 - bis(2-hydroxy-3-methyl-5-sec-butylphenyl)butane; 1,1 - bis(2-hydroxy-3-methyl-5-sec-butylphenyl)-1-phenylpropane; bis-(2-hydroxy-3-methyl-5-sec-butylphenyl)diphenylmethane; bis(2 - hydroxy - 3 - methyl - 5 - sec-butylphenyl)-4,4'-dimethyldiphenylmethane; 2,2 - bis(2-hydroxy-3-methyl-5-sec-butylphenyl)-1,3-diphenylpropane; bis(2 - hydroxy-3-methyl-5-t-butylphenyl)methane; bis(2-hydroxy-3-methyl-5-sec-butylphenyl)methane; 1,1-bis(2-hydroxy-3-methyl-5-t-butylphenyl)ethane; 1,1-bis(2-hydroxy-3-methyl-5-sec-butylphenyl)ethane; 1,1-bis(2-hydroxy-3-methyl-5-t-butylphenyl)propane; 1,1-bis(2-hydroxy-3-methyl-5-sec-butylphenyl)propane; 1,1-bis(2-hydroxy - 3 - methyl-5-t-butylphenyl)butane; 1,1 - bis(2-hydroxy-3-methyl-5-sec-butylphenyl)butane; 1,1-bis(2 - hydroxy - 3 - methyl-5-t-butylphenyl)isobutane; 1,1-bis(2-hydroxy-3-methyl-5-sec-butylphenyl)isobutane; bis(2-hydroxy-3-methyl-5-t-butylphenyl)phenylmethane; bis(2 - hydroxy-3-methyl-5-sec-butylphenyl)phenylmethane; bis(2-hydroxy-3-methyl-5-t-butylphenyl)-4-methylphenylmethane; bis(2-hydroxy-3-methyl-5-sec-butylphenyl)-4-methylphenylmethane; 1,1-bis(2-hydroxy-3-methyl-5-t-butylphenyl)-2-phenylethane; 1,1-bis-(2 - hydroxy-3-methyl-5-sec-butylphenyl)-2-phenylethane; bis(2 - hydroxy - 3 - methyl-5-isooctylphenyl)methane; 1,1-bis(2-hydroxy-3-methyl-5-isooctylphenyl)ethane; 1,1-bis-(2-hydroxy-3-methyl-5-isooctylphenyl)propane; 1,1-bis(2-hydroxy-3-methyl-5-isooctylphenyl)butane; 1,1-bis(2-hydroxy-3-methyl-5-isooctylphenyl)isobutane; 1,1-bis(2-hydroxy-3-methyl-5-isooctylphenyl)-1-phenylethane; 1,1-bis- (2 - hydroxy-3-methyl-5-isooctylphenyl)-1-phenylpropane; bis(2 - hydroxy-3-methyl-5-isooctylphenyl)diphenylmethane; bis(2-hydroxy - 3 - methyl-5-isooctylphenyl)-4,4'-dimethyldiphenylmethane; bis(2 - hydroxy-3-methyl-5-isooctylphenyl)-4-methylphenylmethane; 1,1-bis(2-hydroxy-3-methyl-5-isooctylphenyl)-2-phenylethane; 2,2-bis(2-hydroxy-3-ethyl-5-t-butylphenyl)propane; 2,2-bis(2-hydroxy-3-ethyl-5-t-butylphenyl)butane; 1,1-bis(2-hydroxy-3-ethyl-5-t-butylphenyl) - 1 - phenylethane; 1,1-bis(2-hydroxy-3-ethyl-5-t-butylphenyl)-1-phenylpropane; bis(2-hydroxy-3-ethyl-5-t-butylphenyl)diphenylmethane; bis(2-hydroxy-3-ethyl-5-t-butylphenyl)-4,4'-dimethyldiphenylmethane; 2,2-bis(2-hydroxy - 3 - ethyl-5-t-butylphenyl) - 1,3 - diphenylpropane; 2,2-bis(2-hydroxy - 3 - ethyl-5-sec-butylphenyl)propane; 2,2-bis(2-hydroxy-3-ethyl-5-sec-butylphenyl)butane; 1,1-bis(2-hydroxy-3-ethyl - 5 - sec - butylphenyl)-1-phenylethane; 1,1-bis(2-hydroxy-3-ethyl-5-sec-butylphenyl)-1-phenylpropane; bis(2 - hydroxy-3-ethyl-5-sec-butylphenyl)diphenylmethane; bis(2-hydroxy - 3 - ethyl-5-sec-butylphenyl)-4,4'-dimethyldiphenylmethane; 2,2-bis(2-hydroxy - 3 - ethyl-5-sec-butylphenyl)-1,3-diphenylpropane; bis(2-hydroxy-3-ethyl-5-t-butylphenyl)methane; bis(2-hydroxy-3-ethyl-5-sec-butylphenyl)methane; 1,1 - bis(2-hydroxy-3-ethyl-5-t-butylphenyl)ethane; 1,1-bis(2-hydroxy-3-ethyl-5-sec-butylphenyl)ethane; 1,1 - bis(2 - hydroxy-3-ethyl-5-t-butylphenyl)propane; 1,1-bis(2-hydroxy-3-ethyl-5-sec-butylphenyl)propane; 1,1-bis(2-hydroxy-3-ethyl-5-t-butylphenyl)butane; 1,1 - bis(2-hydroxy-3-ethyl-5-sec-butylphenyl)butane; 1,1-bis(2-hydroxy - 3 - ethyl-5-t-butylphenyl)isobutane; 1,1 - bis(2-hydroxy-3-ethyl-5-sec-butylphenyl)isobutane; bis(2-hydroxy-3-ethyl-5-t-butylphenyl)phenylmethane; bis(2-hydroxy-3-ethyl-5-sec-butylphenyl)phenylmethane; bis(2-hydroxy-3-ethyl-5-sec-butylphenyl)-4-methylphenylmethane; bis(2-hydroxy-3-ethyl-5-t-butylphenyl) - 4 - methylphenylmethane; 1,1-bis(2-hydroxy-3-ethyl-5-t-butylphenyl)-2-phenylethane; 1,1-bis(2-hydroxy-3-ethyl-5-sec-butylphenyl)-2-phenylethane; bis(2-hydroxy-3,5-dimethylphenyl)methane; 1,1 - bis(2-hydroxy-3,5-dimethylphenyl)ethane; 1,1-bis(2-hydroxy - 3,5 - dimethylphenyl)propane; 1,1 - bis(2-hydroxy-3,5-dimethylphenyl)butane; 1,1-bis(2-hydroxy-3,5-dimethylphenyl)isobutane; bis(2 - hydroxy-3,5-diethylphenyl)methane; 1,1-bis(2-hydroxy-3,5-diethylphenyl)ethane; 1,1-bis(2-hydroxy-3,5-diethylphenyl)propane; 1,1-bis(2-hydroxy-3,5-diethylphenyl)butane; 1,1-bis(2-hydroxy-3,5-diethylphenyl)isobutane; bis(2-hydroxy-3-isopropyl-5-methylphenyl)methane; 1,1-bis(2-hydroxy - 3 - isopropyl-5-methylphenyl)ethane; 1,1-bis(2-hydroxy-3-isopropyl-5-methylphenyl)propane; 1,1-bis(2-hydroxy - 3 - isopropyl-5-methylphenyl)butane; 1,1-bis(2-hydroxy-3-isopropyl-5-methylphenyl)isobutane; 1,1-bis(2 - hydroxy - 3 - isopropyl-5-methylphenyl)-1-phenylethane; 1,1-bis(2-hydroxy-3-isopropyl-5-methylphenyl)-1-phenylpropane; bis(2-hydroxy-3-isopropyl-5-methylphenyl)diphenylmethane; bis(2-hydroxy-3-isopropyl-5-methylphenyl)-4,4'-dimethyldiphenylmethane; bis(2-hydroxy-3-isopropyl-5-methylphenyl)-4-methylphenylmethane; 1,1-bis(2 - hydroxy - 3 - isopropyl-5-methylphenyl)-2-phenylethane; bis(2-hydroxy - 3,5 - diisopropylphenyl)methane; 1,1-bis(2-hydroxy-3,5-diisopropylphenyl)ethane; 1,1-bis-(2-hydroxy-3,5-diisopropylphenyl)propane; 1,1-bis(2-hydroxy-3,5-diisopropylphenyl)butane; 1,1 - bis(2-hydroxy-3,5-diisopropylphenyl)isobutane; bis(2-hydroxy - 3,5 - di-sec-butylphenyl)methane; 1,1 - bis(2-hydroxy-3,5-di-sec-butylphenyl)ethane; 1,1 - bis(2-hydroxy-3,5-di-sec-butylphenyl)propane; 1,1-bis(2-hydroxy-3,5-di-sec-butylphenyl)butane; 1,1-bis(2-hydroxy-3,5-di-sec-butylphenyl)isobutane; bis(2-hydroxy-3,5-di-t-butylphenyl)methane; 1,1-bis(2-hydroxy-3,5-di-t-butylphenyl)ethane; 1,1-bis(2-hydroxy-3,5-di-t-butylphenyl)propane; 1,1 - bis(2-hydroxy-3,5-di-t-butylphenyl)butane; 1,1 - bis(2-hydroxy-3,5-di-t-butylphenyl)isobutane; 2,2 - bis(2-hydroxy-3-sec-butyl-5-methylphenyl)propane; 2,2-bis(2-hydroxy - 3 - sec-butyl-5-methylphenyl)butane; 1,1-bis(2-hydroxy - 3 - sec-butyl-5-methylphenyl)-1-phenylethane; 1,1 - bis(2-hydroxy-3-sec-butyl-5-methylphenyl)-1-phenylpropane; bis(2-hydroxy-3-sec - butyl - 5 - methylphenyl)diphenylmethane; bis(2-hydroxy - 3 - sec-butyl-5-methylphenyl)-4,4'-dimethyldiphenylmethane; 2,2 - bis(2-hydroxy-3-sec-butyl-5-methylphenyl)-1,3-diphenylpropane; bis(2-hydroxy-3-t-butyl-5-methylphenyl)methane; bis(2 - hydroxy-3-sec-butyl-5-methylphenyl)methane; 1,1-bis(2-hydroxy-3-t-butyl - 5 - methylphenyl)ethane; 1,1 - bis(2-hydroxy-3-sec-butyl-5-methylphenyl)ethane; 1,1-bis(2-hydroxy-3-t-butyl-5-methylphenyl)propane; 1,1-bis(2-hydroxy-3-sec-butyl-5-methylphenyl)propane; 1,1-bis(2-hydroxy-3-t-butyl-5-methylphenyl)butane; 1,1 - bis(2-hydroxy-3-t-butyl-5-methylphenyl)isobutane; bis(2 - hydroxy-3-t-butyl-5-methylphenyl)phenylmethane; bis(2 - hydroxy-3-t-butyl - 5 - methylphenyl)-4-methylphenylmethane; 1,1-bis(2-hydroxy - 3 - t - butyl-5-methylphenyl)-2-phenylethane; 1,1 - bis(2-hydroxy-3-sec-butyl - 5 - methylphenyl)butane; 1,1-bis(2-hydroxy-3-sec-butyl - 5 - methylphenyl)isobutane; bis(2 - hydroxy-3-sec-butyl-5-methylphenyl)phenylmethane; bis(2 - hydroxy-3-sec - butyl-5-methylphenyl)-4-methylphenylmethane; 1,1-bis(2 - hydroxy-3-sec-butyl - 5 - methylphenyl)-2-phenylethane; bis(2-hydroxy-3-sec-butyl-6-methylphenyl)methane; 1,1-bis(2-hydroxy - 3 - sec-butyl - 6 - methylphenyl)ethane; 1,1-bis(2-hydroxy-3-sec-butyl - 6 - methylphenyl)propane; 1,1 - bis(2-hydroxy-3-sec-butyl-6-methylphenyl)butane; 1,1-bis(2-hydroxy-3-sec-butyl-6-methylphenyl)isobutane; 1,1-bis(2-hydroxy-3-sec-butyl-6-methylphenyl)-1-phenylethane; 1,1-bis(2-hydroxy-3-sec-butyl - 6 - methylphenyl) - 1 - phenylpropane; bis(2-hydroxy-3-sec-butyl-6-methylphenyl)diphenylmethane; bis(2 - hydroxy - 3 - sec-butyl-6-methylphenyl)-4,4'-dimethyldiphenylmethane; bis-(2 - hydroxy-3-sec-butyl-6-methylphenyl)-4-methylphenyl-methane; 1,1-bis(2-hydroxy-3-sec-butyl-6-methylphenyl)-2-phenylethane; bis(2-hydroxy-3-t-butyl-6-methylphenyl)methane; 1,1-bis(2-hydroxy-3-t-butyl - 6 - methylphenyl)ethane; 1,1-bis(2-hydroxy-3-t-butyl-6-methylphenyl)propane; 1,1-bis(2-hydroxy-3-t-butyl-6-methylphenyl)butane; 1,1 - bis(2-hydroxy-3-t-butyl - 6 - methylphenyl)isobutane; bis(2 - hydroxy-3-t-butyl-6-methylphenyl) - 4 - methylphenylmethane; 1,1-bis(2-hydroxy-3-t-butyl-6-methylphenyl)-2-phenylethane; bis(2-methyl-4-hydroxy-5-sec-butylphenyl)methane; 1,1-bis(2-methyl - 4 - hydroxy - 5 - sec-butylphenyl)ethane; 1,1 - bis(2-methyl-4-hydroxy-5-sec-butylphenyl)propane; 1,1-bis(2-methyl-4-hydroxy-5-sec-butylphenyl)butane; 1,1 - bis(2-methyl-4-hydroxy-5-sec-butylphenyl)isobutane; 1,1-bis(2-methyl-4-hydroxy-5-sec-butylphenyl)-1-phenylethane; 1,1 - bis(2-methyl-4-hydroxy-5-sec-butylphenyl) - 1 - phenylpropane; bis(2-methyl-4-hydroxy-5-sec-butylphenyl)diphenylmethane; bis(2-methyl-4-hydroxy - 5 - sec-butylphenyl) - 4,4' - dimethyldiphenylmethane; bis(2 - methyl-4-hydroxy-5-sec-butylphenyl)-4-methylphenylmethane; 1,1-bis(2-methyl-4-hydroxy-5-sec-butylphenyl)-2-phenylethane; bis(2-methyl-4-hydroxy-5-t-butylphenyl)methane; 1,1-bis(2-methyl - 4 - hydroxy-5-t-butylphenyl)ethane; 1,1-bis(2-methyl-4-hydroxy-5-t-butylphenyl)propane; 1,1-bis(2-methyl - 4 - hydroxy-5-t-butylphenyl)butane; 1,1-bis(2-methyl-4-hydroxy-5-t-butylphenyl)isobutane; 1,1 - bis(2-methyl-4-hydroxy-5-t-butylphenyl)-1-phenylethane; 1,1-bis(2-methyl-4-hydroxy-5-t-butylphenyl)-1-phenylpropane; bis(2-methyl - 4 - hydroxy-5-t-butylphenyl)diphenylmethane; bis(2-methyl-4-hydroxy-5-t - butylphenyl) - 4,4' - dimethyldiphenylmethane; bis(2-methyl - 4 - hydroxy-5-t-butylphenyl) - 4 - methylphenylmethane; 1,1-bis(2-methyl-4-hydroxy-5-t-butylphenyl)-2-phenylethane; bis(2-hydroxy-4-methyl-5-sec-butylphenyl)methane; 1,1-bis(2-hydroxy-4-methyl-5-sec-butylphenyl)ethane; 1,1-bis(2-hydroxy - 4 - methyl-5-sec-butylphenyl)propane; 1,1 - bis(2-hydroxy-4-methyl-5-sec-butylphenyl)butane; 1,1-bis(2-hydroxy - 4 - methyl-5-sec-butylphenyl)isobutane; 1,1-bis(2-hydroxy-4-methyl-5-sec-butylphenyl)-1-phenylethane; 1,1 - bis(2-hydroxy-4-methyl-5-sec-butylphenyl)-1-phenylpropane; bis(2-hydroxy-4-methyl-5-sec-butylphenyl)diphenylmethane; bis(2-hydroxy-4-methyl-5-sec-butylphenyl)-4,4'-dimethyldiphenylmethane; bis(2-hydroxy-4-methyl-5-sec - butylphenyl)-4-methylphenylmethane; 1,1-bis(2-hydroxy - 4 - methyl-5-sec-butylphenyl)-2- phenylethane; bis(2-hydroxy-4-methyl-5-t-butylphenyl)methane; 1,1-bis(2-hydroxy-4-methyl-5-t-butylphenyl)ethane; 1,1-bis(2-hydroxy-4-methyl-5-t-butylphenyl)propane; 1,1-bis(2-hydroxy-4-methyl-5-t-butylphenyl)butane; 1,1-bis(2-hydroxy-4-methyl-5-t-butylphenyl)isobutane; 1,1-bis(2-hydroxy-4-methyl-5-t-butylphenyl)-1-phenylethane; 1,1-bis(2-hydroxy-4-methyl-5-t-butylphenyl)-1-phenylpropane; bis(2-hydroxy-4-methyl-5-t-butylphenyl)diphenylmethane; bis(2-hydroxy-4-methyl-5-t-butylphenyl)-4,4'-dimethyldiphenylmethane; bis(2-hydroxy-4-methyl-5-t-butylphenyl)-4-methylphenylmethane; 1,1-bis(2-hydroxy-4-methyl-5-t-butylphenyl)-2-phenylethane; and the like.

The bis(hydroxyphenyl)alkanes are generally solids under normal atmospheric conditions. It is desirable, therefore, to dissolve the product in an inert solvent prior to contacting with ammonia. Solvents which may be used for this invention are hexane, benzene, naphtha, cyclohexane, alcohol, carbon tetrachloride, chloroform, ether, dioxane, triisobutylene, Stoddard solvent, and the like. Naturally, the amount of solvent used will depend upon the amount of solid product that a particular solvent will dissolve. The particular solvent employed should be one which has little, if any, solvent action on the particular adduct being made. Therefore, the solvent will dissolve the bis(hydroxyphenyl)alkane in preference to the ammonia complex. Stoddard solvent is particularly suitable for the process of the invention. Alcohol can be used but is less desirable than some of the other solvents in that it has good solvent action on the adduct as well as the bis(hydroxyphenyl)alkane. This is not a serious consequence when the primary object is to purify ammonia because the adduct in such a case need not be separated from the solvent. The ammonia is released by heating the solution of adduct dissolved in the solvent. Of course, in this case, it is desirable to employ a solvent having a boiling point above the dissociation temperature of the adduct. The solvent containing the bis(hydroxyphenyl)alkane is cooled and then contacted with additional quantities of impure ammonia whereby the adduct is again formed. After the ammonia is released the cycle can be repeated. Alcohol also has high solvent power for ammonia, thus cutting down on the efficiency of the process on a once-through basis. However, in a continuous process the fact that the alcohol takes up ammonia is not undesirable because the unexpelled ammonia remains in the system, circulating with the solvent.

When the bis(hydroxyphenyl)alkane has been dissolved in the solvent, adduct formation is preferably accomplished by introducing ammonia or a medium rich in ammonia below the surface of the solution. Because of the relatively low dissociation temperature of the adduct which is formed, the contacting with ammonia is carried out at a relatively low temperature. We have found that the temperature is preferably maintained at about 0° to about 30° C. at atmospheric pressure. It will be understood, of course, that higher temperatures can be employed if the partial pressure of ammonia is maintained above the dissociation pressure of the complex. The adduct formation can be carried out either at atmospheric, subatmospheric or superatmospheric pressure as long as the ammonia partial pressure at the particular temperature employed is greater than the dissociation pressure of the complex. When the ammonia is first added to the solution, there is generally a slight rise in the temperature of the solution indicating that an exothermic reaction is taking place between the bis(hydroxyphenyl)alkane and the ammonia. Ammonia is advantageously added until the rise in temperature subsides. The amount of ammonia taken up depends upon the bis(hydroxyphenyl)alkane employed and comprises about one to two mols of ammonia per mol of the bis(hydroxyphenyl)alkane. Adduct formation is evidenced by exothermic heat of reaction and in most cases by the settling of a precipitate from the solution. If only an increase in temperature is noted, precipitation of the adduct may be induced by lowering the temperature of the solution below that temperature at which adduct will remain in solution, i.e., below the saturation temperature. As mentioned above, the particular solvent employed is also significant in this regard. By proper selection of solvents various homologues of the bis(hydroxyphenyl)alkanes can be separated from one another by the process of the invention. The precipitate which forms comprises a complex between ammonia and the bis(hydroxyphenyl)alkane. The adduct is then separated from the solution. If a very high degree of purification of the bis(hydroxyphenyl)alkane is desired, the adduct may be washed one or more times with solvent or solvent saturated with ammonia.

The adducts which are formed in accordance with the process of the invention are new products useful in fungicidal and bactericidal preparations and also serve as a means of supplying pure ammonia or bis(hydroxyphenyl)alkane as needed simply by warming the adduct. The adduct can also be used to maintain a partial pressure of ammonia where desired.

The adduct is dissociated into ammonia and bis(hydroxyphenyl)alkane either by heating the adduct to a temperature above its dissociation temperature or by reducing the pressure below the pressure at which the adduct is stable. Naturally, the temperature and pressure at which the adduct will dissociate will vary depending upon the particular bis(hydroxyphenyl)alkane-ammonia adduct. In most instances, the dissociation takes place readily at temperatures above about 50° C. at atmospheric pressure. The dissociation is advantageously carried carried out at a temperature not exceeding the melting point of the particular bis(hydroxyphenyl)alkane, which, for example, in the case of bis(2-hydroxy-3-t-butyl-5-methylphenyl)methane would be at a temperature not exceeding about 131° C. Dissociation at atmospheric pressure in most instances can be carried out at about 50° to about 100° C. with a temperature of about 60° to about 70° C. being preferred. Dissociation is also readily effected at pressures below about 100 mm. Hg at room temperature. Dissociation may also be effected by other means such as by the addition of water, dilute acids, and other materials having high affinity for ammonia.

Figure 1 illustrates the relationship between pressure and temperature for the dissociation of the adduct between bis(2-hydroxy-3-t-butyl-5-methylphenyl)methane and ammonia. There is some dissociation of bis(2-hydroxy-3-t-butyl-5-methylphenyl)methane - ammonia at room temperature and atmospheric pressure. However, dissociation is slow at these conditions. The degree of dissociation of the particular adduct at various temperatures as determined experimentally is shown by the following vapor pressure-temperature relationship.

| Temperature, °C. | Ammonia pressure, mm. Hg |
|---|---|
| 0 | 13.7 |
| 27 | 107.0 |
| 60 | 486.5 |
| 70.7 | 767.5 |

The relationship is shown diagrammatically by the curve in Figure 1. From an examination of this curve it will be seen that the tendency for bis(2-hydroxy-3-t-butyl-5-methylphenyl)methane-ammonia to dissociate is not great at temperatures below about 10° C., but that dissociation becomes progressively greater as the temperature is increased and becomes substantially complete at about 70° C.

The purification processes of this invention can be carried out either batchwise or continuously. The processes are particularly adaptable to continuous operation in that the solvent used in dissolving the crude product and the ammonia used in forming the adduct can both be recovered and reused without any particular difficulty.

The purification of a composition comprising a bis-(hydroxyphenyl)alkane and the purification of an ammonia-containing gas may be readily understood by reference to Figure 2 which illustrates diagrammatically one embodiment of the invention.

Now referring to Figure 2, a composition comprising bis(2-hydroxy-3-t-butyl-5-methylphenyl)methane having a melting point of about 117° to about 125° C. is introduced from storage vessel 10 by conduit 11 into mixer 12. In mixer 12 the composition comprising bis(2-hydroxy-3-t-butyl-5-methylphenyl)methane is dissolved in a solvent, such as Stoddard solvent, introduced from solvent storage vessel 13 through conduits 14 and 15. Mixer 12 is equipped with a cooling jacket 16 by means of which the contents of mixer 12 are maintained at a temperature between about 0° and about 30° C. The solution formed in mixer 12 is then passed by conduit 17 into the top of reaction vessel 18. Reaction vessel 18 is equipped with a cooling jacket 19 to regulate the reaction temperature. A gas comprising ammonia is introduced into the lower portion of reaction vessel 18 by conduit 20. The gas comprising ammonia passes upwardly through reaction vessel 18 in countercurrent flow to the solution of solvent and composition comprising bis(2-hydroxy-3-t-butyl-5-methylphenyl)methane. As the gas passes upwardly through reaction vessel 18, the gas becomes substantially or at least partially stripped of its ammonia through the formation of an adduct which is formed between the ammonia and the bis(2-hydroxy-3-t-butyl-5-methylphenyl)methane. Effluent gas, from which a substantial amount of the ammonia has been removed, passes from the top of reaction vessel 18 through conduit 21. It will be understood that a series of reaction vessels may be employed with the exit gas from one reaction vessel passing to a subsequent reaction vessel. When more than one reaction vessel is used, the solvent containing the bis(2-hydroxy-3-t-butyl-5-methylphenyl)methane passes from one reaction vessel to a preceding vessel. Therefore, as the solvent containing bis(2-hydroxy-3-t-butyl-5-methylphenyl)methane passes from one vessel to another it contacts a gas which is progressively richer in ammonia. Of course, when the contacting gas is substantially pure ammonia, as it may be when the primary object is to purify the bis(2-hydroxy-3-t-butyl-5-methylphenyl)methane, the waste gas, which in that instance may contain a substantial amount of ammonia may be recycled to conduit 20 by conduit 22.

The adduct which is formed in reaction vessel 18 together with solvent passes from the bottom of reaction vessel 18 through conduit 23 to a separator 24. Of course, when the primary object is to purify ammonia, the separation of the solvent from the adduct is not necessary. In fact, the process can be carried out in the reaction vessel by alternately cooling and heating the reaction vessel during the adduct formation and the dissociation of the adduct, respectively.

Separator 24 may be a filter or a centrifuge by means of which the solvent is separated from the adduct and returned by means of conduit 25 to conduit 15 wherein it is admixed with fresh solvent introduced by conduit 14. The amount of solvent introduced by conduit 14 from vessel 13 is ordinarily only that amount required to make up for any handling loss in the system. As the process continues, it may become desirable to subject the solvent to a purification process. Also, this solvent may contain a homologue of the adduct in which case the solvent can be subjected to further treatment to recover the homologue. Accordingly, the solvent in conduit 25 may be removed to a purification system (not shown) prior to its being returned to conduit 15. The adduct may be washed with additional quantities of solvent in which case a portion of solvent is withdrawn from conduit 15 by conduit 26 and passed through a cooler 27 into separator 24. One or more intermittent washing operations can thus effectively be accomplished.

The adduct is then removed from separator 24 through conduit 28 to rotary kiln 29. In rotary kiln 29 the adduct is heated to a temperature between about 50° and 100° C. whereby the adduct is dissociated into ammonia and bis(2-hydroxy-3-t-butyl-5-methylphenyl)methane. The bis(2-hydroxy-3-t-butyl-5-methylphenyl)methane is removed from kiln 29 and collected in storage vessel 30. Ammonia together with a small amount of solvent is removed from rotary kiln 29 through conduit 31 to a condenser 32. The removal of ammonia is facilitated if the kiln is operated in a closed system under subatmospheric pressure. Another means of removing the ammonia from the system comprises passing an inert gas through the kiln. The gas can then be separated from the ammonia by condensing the ammonia in a conventional system (not shown). The inert gas can then be recycled to the kiln. The separation of the inert gas from the ammonia is advantageously at a point subsequent to the separation of solvent. In condenser 32 solvent is condensed and removed by conduit 33 to conduit 25 for further use. Substantially pure ammonia in the form of a gas is removed from condenser 32 by means of conduit 34 and is passed to a collection and storage system not shown. When the primary object is to purify the bis(2-hydroxy-3-t-butyl-5-methylphenyl)methane, pure ammonia can be recycled through conduit 35 to conduit 20. When it is desired to recover only pure ammonia, the bis(2-hydroxy-3-t-butyl-5-methylphenyl)methane can be returned to storage vessel 10 by conduit 36.

The following specific examples will illustrate the preparation and the purification of bis(hydroxyphenyl)alkanes and the purification of ammonia in accordance with the process of the invention.

*Example 1*

Into a flask were placed 205.3 grams (1.25 mols) of 2-tertiary-butyl-4-methylphenol, 18.7 grams (0.624 mol) of formaldehyde, 5 grams of anhydrous zinc chloride, and 150 ml. of glacial acetic acid. The solution thus formed was cooled to a temperature of about 15° to about 20° C. in an ice bath after which anhydrous hydrogen chloride was introduced slowly below the surface of the solution. The addition of hydrogen chloride was continued for about two hours while maintaining the temperature of the reactants between about 15° and 20° C. The reaction mixture was then allowed to stand until the next day (about 16 hours) during which time a solid material precipitated out of solution. The solid thus formed was stirred into water and then filtered. The crystalline product thus obtained had a melting point of about 117° to about 125° C. This product comprised bis(2-hydroxy-3-t-butyl-5-methylphenyl)methane containing some 2-tertiary-butyl-4-methylphenol. The crude product thus obtained was washed with water and after removing the water was then dissolved in 412 ml. of petroleum naphtha. The naphtha solution was then further washed with water until the filtrate was neutral to litmus paper.

The neutralized naphtha solution of bis(2-hydroxy-3-t-butyl-5-methylphenyl)methane was then placed in a flask. The temperature of the solution was about 25° C. Anhydrous ammonia was then introduced slowly below the surface of the solution for a period of about 15 minutes during which time the temperature increased to about 29° C. Ammonia was introduced for an additional period of about one hour with cooling during which time the temperature fell to 21° C. During the addition of the ammonia, white crystals were formed. These crystals comprised the adduct between bis(2-hydroxy-3-t-butyl-5-methylphenyl)methane and ammonia. These crystals were separated from the naphtha solution by filtration.

A portion of the crystals were removed for testing. The remaining crystals were washed twice with naphtha which had been saturated with ammonia. Samples of the crystals were taken after each washing.

The three samples thus obtained were each divided into two parts. One part of each was placed under open cover overnight at room temperature in order to allow dissociation of the complex. Dissociation of the second part of each sample was accomplished at a reduced pressure of about 1 mm. Hg pressure at room temperature. The melting points of the three samples from which the ammonia had been removed either by heating or by reduced pressure were determined and were found to be as follows:

|   | Room temperature at atmospheric pressure, ° C. | Room temperature at 1 mm. Hg pressure, ° C. |
|---|---|---|
| Sample 1 | 129.5 to 131.5 | 129.5 to 131.5 |
| Sample 2 | 130.5 to 132 | 131 to 132 |
| Sample 3 | 131.5 to 132 | 131.5 to 132 |

It is evident from the above that purification through adduct formation in accordance with the process of this invention greatly improves the melting point of the crude bis(2-hydroxy-3-t-butyl-5-methylphenyl)methane regardless of the method employed in dissociating the adduct even without washing the adduct with naphtha (Sample 1). The product obtained was odorless. The melting point of the pure compound is 131.5° to 132° C.

*Example II*

To illustrate further the purification of bis(hydroxyphenyl)alkanes in accordance with this invention, a crude product comprising 1,1-bis(2-hydroxy-3-t-butyl-5-methylphenyl)ethane having a melting point of 78° to 92.5° C. was dissolved in naphtha. Anhydrous ammonia was then introduced below the surface of the naphtha solution at room temperature. The addition of the ammonia was continued as long as a precipitate formed. The precipitate was then separated from the naphtha solution and without washing the precipitate was allowed to air-dry overnight. Air-drying removed practically all of the ammonia from the adduct and gave an improved product which melted at 100° to 103.5° C. If a product of greater purity is desired, it will be understood that the adduct can be washed with additional quantities of naphtha. The melting point of the pure compound is 106° C.

In accordance with the above procedure, other adducts with ammonia have been formed with 2,2-bis(4-hydroxyphenyl)propane; bis(2-hydroxy-3-t-butyl-5-methylphenyl)phenylmethane; 1,1-bis(2-hydroxy-3-t-butyl-5-methylphenyl)isobutane; bis(2-hydroxy-3-methyl-5-isooctylphenyl)methane; 1,1-bis(2-hydroxy-3-t-butyl-5-methylphenyl)propane; and bis(2-hydroxy-3-isopropyl-5-methylphenyl)methane.

*Example III*

To illustrate the purification of 2,2-bis-(4-hydroxyphenyl)propane in accordance with this invention, two grams of a crude product comprising 2,2-bis(4-hydroxyphenyl)propane, having a melting point of 152° to 156° C., was dissolved in a solvent mixture consisting of 16 ml. of isopropyl ether and 10 ml. of naphtha. Anhydrous ammonia was then introduced below the surface of the solution at room temperature. The addition of ammonia was continued as long as a precipitate formed. A maximum temperature of about 24° C. was reached after ammonia had been introduced for a period of about two minutes. A viscous liquid phase separated from the reaction mass. The viscous material then crystallized. Ammonia was then introduced into the reaction mass for an additional 15 minutes. The reaction mixture was cooled to about 0° C, and then filtered. The crystals thus obtained comprised the adduct between 2,2-bis(4-hydroxyphenyl)propane and ammonia. The crystals melted at about 65° to 83° C. with decomposition. The crystals were then allowed to stand for three days under open cover in order to remove the ammonia from the adduct. The crystals obtained after the ammonia had been completely removed melted at 154.5° to 156.5° C. and comprised substantially pure 2,2-bis(4-hydroxyphenyl)propane.

*Example IV*

To illustrate the purification of ammonia in accordance with the process of the invention, 19.11 grams (0.059 mol) of bis(2-hydroxy-3-t-butyl-5-methylphenyl)methane was dissolved in 500 ml. of Stoddard solvent. The solution was then cooled to between about 0° and about 5° C. in an ice bath after which a mixture consisting of about 50 percent by weight of ammonia and 50 percent by weight of air was introduced slowly below the surface of the solution. The addition of the mixture of air and ammonia was continued for about one-half hour while maintaining the temperature of the solution between about 0° and about 5° C. As the addition of ammonia and air continued, an adduct between ammonia and bis(2-hydroxy-3-t-butyl-5-methylphenyl)methane was formed. This adduct in the form of a precipitate settled to the bottom of the reaction vessel. The amount of ammonia taken up by the bis(2-hydroxy-3-t-butyl-5-methylphenyl)methane corresponded to about one mol of ammonia per mol of the bis(2-hydroxy-3-t-butyl-5-methylphenyl)methane. Ordinarily, at this point the precipitate would be separated from the solvent in order to obtain pure ammonia and pure bis(2-hydroxy-3-t-butyl-5-methylphenyl)methane. However, since this experiment was for the purpose of illustrating the purification of ammonia, the precipitate was not separated from the solvent.

The vessel containing the adduct and the Stoddard solvent was removed from the ice bath and placed in a hot water bath. The contents of the flask were heated by this means to a temperature of about 90° C. The adduct dissociated into bis(2-hydroxy-3-t-butyl-5-methylphenyl)methane and ammonia. The ammonia which was released was absorbed in standardized hydrochloric acid. At the end of about two hours all of the ammonia was released from the adduct. During the formation of the adduct, 92.75 percent of the ammonia was removed from the air-ammonia mixture. During the dissociation of the adduct, 97.24 percent of the ammonia taken up in the adduct was released and collected in standardized hydrochloric acid. The efficiency of this process for the recovery of ammonia from mixtures thereof with air is thus readily apparent.

When 2,2-bis(4-hydroxyphenyl)propane was used to purify ammonia, it took up about two mols of ammonia per mol of the 2,2-bis(4-hydroxyphenyl)propane.

While our invention has been described above with reference to various specific examples and embodiments, it will be understood that the invention is not limited to such illustrated examples and embodiments and may be variously practiced within the scope of the claims hereinafter made.

We claim:

1. The process of purifying a gem-bis(hydroxyphenyl)alkane containing as an impurity a small amount of a compound selected from the group consisting of phenol and alkylated phenol which comprises dissolving the gem-bis(hydroxyphenyl)alkane and said impurity in an organic solvent, contacting the solution thus formed with anhydrous ammonia at about 0° to about 30° C. for a time sufficient to form a solid adduct between the gem-bis(hydroxyphenyl)alkane and ammonia, separating the solid adduct thus formed from the reaction mass, and dissociating the solid adduct into ammonia and a substantially pure gem-bis(hydroxyphenyl)alkane.

2. As a new composition the solid adduct obtained in the process of claim 1.

3. The process of purifying bis(2-hydroxy-3-t-butyl-5-methylphenyl)methane containing as an impurity a small amount of a compound selected from the group consisting of phenol and alkylated phenol which comprises dissolving the bis(2-hydroxy-3-t-butyl-5-methylphenyl)methane and said impurity in an organic solvent, contacting the solution thus formed with anhydrous ammonia at about 0° to about 30° C. for a time sufficient to form a solid adduct between the bis(2-hydroxy-3-t-butyl-5-methylphenyl)methane and ammonia, separating the solid adduct thus formed from the reaction mass, and dissociating the solid adduct into ammonia and substantially pure bis(2-hydroxy-3-t-butyl-5-methylphenyl)methane.

4. As a new composition of matter the solid adduct obtained in the process of claim 3.

5. The process of purifying 1,1-bis(2-hydroxy-3-t-butyl-5-methylphenyl)ethane containing as an impurity a small amount of a compound selected from the group consisting of phenol and alkylated phenol which comprises dissolving the 1,1-bis(2-hydroxy-3-t-butyl-5-methylphenyl)ethane and said impurity in an organic solvent, contacting the solution thus formed with anhydrous ammonia at about 0° to about 30° C. for a time sufficient to form a solid adduct between the 1,1-bis(2-hydroxy-3-t-butyl-5-methylphenyl)ethane and ammonia, separating the solid adduct thus formed from the reaction mass, and dissociating the solid adduct into ammonia and substantially pure 1,1-bis(2-hydroxy-3-t-butyl-5-methylphenyl)ethane.

6. As a new composition of matter the solid adduct obtained in the process of claim 5.

7. The process of purifying 2,2-bis(4-hydroxyphenyl)propane containing as an impurity a small amount of a compound selected from the group consisting of phenol and alkylated phenol which comprises dissolving the 2,2-bis(4-hydroxyphenyl)propane and said impurity in an organic solvent, contacting the solution thus formed with anhydrous ammonia at about 0° to about 30° C. for a time sufficient to form a solid adduct between the 2,2-bis(4-hydroxyphenyl)propane and ammonia, separating the solid adduct thus formed from the reaction mass, and dissociate the solid adduct into ammonia and substantially pure 2,2-bis(4-hydroxyphenyl)propane.

8. As a new composition of matter the solid adduct obtained in the process of claim 7.

9. The process of purifying bis(2-hydroxy-3-t-butyl-5-methylphenyl)methane containing as an impurity a small amount of a compound selected from the group consisting of phenol and alkylated phenol which comprises dissolving the bis(2-hydroxy-3-t-butyl-5-methylphenyl-methane and said impurity in a petroleum naphtha, contacting the solution thus formed with anhydrous ammonia at about 0° to about 30° C. for a time sufficient to form a solid adduct between the bis(2-hydroxy-3-t-butyl-5-methylphenyl)methane and ammonia, separating the solid adduct thus formed from the reaction mass, and heating the solid adduct at a temperature above about 50° C. at atmospheric pressure to dissociate the solid adduct into ammonia and substantially pure bis(2-hydroxy-3-t-butyl-5-methylphenyl)methane.

10. The process of purifying bis(2-hydroxy-3-t-butyl-5-methylphenyl)methane containing as an impurity a small amount of a compound selected from the group consisting of phenol and alkylated phenol which comprises dissolving the bis(2-hydroxy-3-t-butyl-5-methylphenyl)methane and said impurity in a petroleum naphtha, contacting the solution thus formed with anhydrous ammonia at about 0° to about 30° C. for a time sufficient to form a solid adduct between the bis(2-hydroxy-3-t-butyl-5-methylphenyl)methane and ammonia, separating the solid adduct thus formed from the reaction mass, and subjecting the solid adduct to a pressure below about 100 mm. of Hg at room temperature to dissociate the solid adduct into ammonia and substantially pure bis(2-hydroxy-3-t-butyl-5-methylphenyl)methane.

11. The process of purifying 1,1-bis(2-hydroxy-3-t-butyl-5-methylphenyl)ethane containing as an impurity a small amount of a compound selected from the group consisting of phenol and alkylated phenol which comprises dissolving the 1,1-bis(2-hydroxy-3-t-butyl-5-methylphenyl)ethane and said impurity in a petroleum naphtha, contacting the solution thus formed with anhydrous ammonia at about 0° to about 30° C. for a time sufficient to form a solid adduct between the 1,1-bis(2-hydroxy-3-t-butyl-5-methylphenyl)ethane and ammonia, separating the solid adduct thus formed from the reaction mass, and dissociating the solid adduct into ammonia and substantially pure 1,1-bis(2-hydroxy-3-t-butyl-5-methylphenyl)ethane.

12. The process of purifying 2,2-bis(4-hydroxyphenyl)propane containing as an impurity a small amount of a compound selected from the group consisting of phenol and alkylated phenol which comprises dissolving the 2,2-bis(4-hydroxyphenyl)propane and said impurity in a solvent mixture consisting of isopropyl ether and a petroleum naphtha, contacting the solution thus formed with anhydrous ammonia at about 0° to about 30° C. for a time sufficient to form a solid adduct between the 2,2-bis(4-hydroxyphenyl)propane and ammonia, separating the solid adduct thus formed from the reaction mass, and dissociating the solid adduct into ammonia and substantially pure 2,2-bis(4-hydroxyphenyl)propane.

References Cited in the file of this patent

UNITED STATES PATENTS

| 2,022,256 | Schuler | Nov. 26, 1935 |
| 2,061,779 | Semon | Nov. 24, 1936 |
| 2,106,734 | Gollmar | Feb. 1, 1938 |
| 2,128,029 | Hendrey | Aug. 23, 1938 |
| 2,250,480 | Gump | July 29, 1941 |